United States Patent
Yamazaki

(10) Patent No.: US 7,317,488 B2
(45) Date of Patent: Jan. 8, 2008

(54) METHOD OF AND SYSTEM FOR AUTOFOCUS

(75) Inventor: Akihisa Yamazaki, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 759 days.

(21) Appl. No.: 10/669,473

(22) Filed: Sep. 25, 2003

(65) Prior Publication Data

US 2004/0061800 A1    Apr. 1, 2004

(30) Foreign Application Priority Data

Sep. 27, 2002   (JP) .............................. 2002-283896
Mar. 26, 2003   (JP) .............................. 2003-085195

(51) Int. Cl.
*H04N 5/232* (2006.01)
*G03B 13/36* (2006.01)

(52) U.S. Cl. ............... 348/353; 348/345; 348/349; 348/350; 348/354

(58) Field of Classification Search .......... 348/353, 348/350, 349, 354, 356, 315
See application file for complete search history.

(56) References Cited

U.S. PATENT DOCUMENTS

| | | | |
|---|---|---|---|
| 5,539,462 A * | 7/1996 | Lee et al. .................... | 348/349 |
| 5,668,597 A * | 9/1997 | Parulski et al. ............. | 348/350 |
| 5,877,809 A * | 3/1999 | Omata et al. ................ | 348/345 |
| 6,211,915 B1 * | 4/2001 | Harada ........................ | 348/298 |
| 6,577,344 B2 * | 6/2003 | Kadohara et al. ........... | 348/350 |
| 6,831,692 B1 * | 12/2004 | Oda ............................ | 348/315 |

FOREIGN PATENT DOCUMENTS

JP    2001-141989 A    5/2001

* cited by examiner

*Primary Examiner*—David Ometz
*Assistant Examiner*—Wanda M. Negrón
(74) *Attorney, Agent, or Firm*—Birch, Stewart, Kolasch & Birch, LLP

(57) ABSTRACT

An image of a subject is taken by a solid image taking device including a first image taking element having a plurality of pixels and a second image taking element having a plurality of pixels smaller than those of the first image taking element. First and second evaluations on contrast obtained by integrating high-frequency components of first and second image signals representing an image of the subject taken by the first and second image taking elements are calculated. The focus is adjusted on the basis of the first and second evaluations on contrast so that the subject is imaged on the solid image taking device.

18 Claims, 9 Drawing Sheets

FREE FROM HIGHT BRIGHTNESS POINT

INCLUDING HIGH BRIGHTNESS POINT

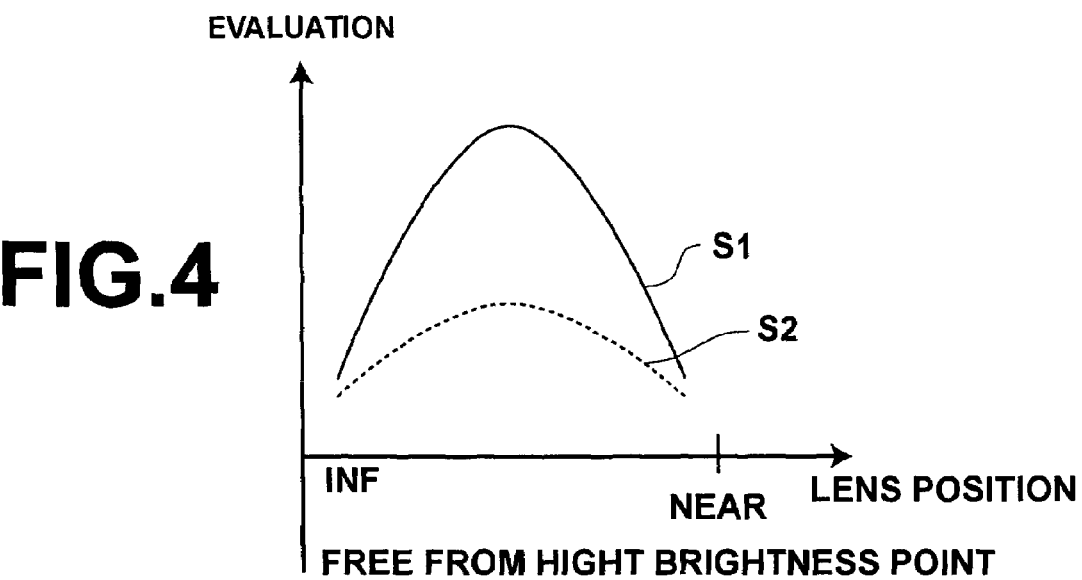
FIG.4 FREE FROM HIGHT BRIGHTNESS POINT
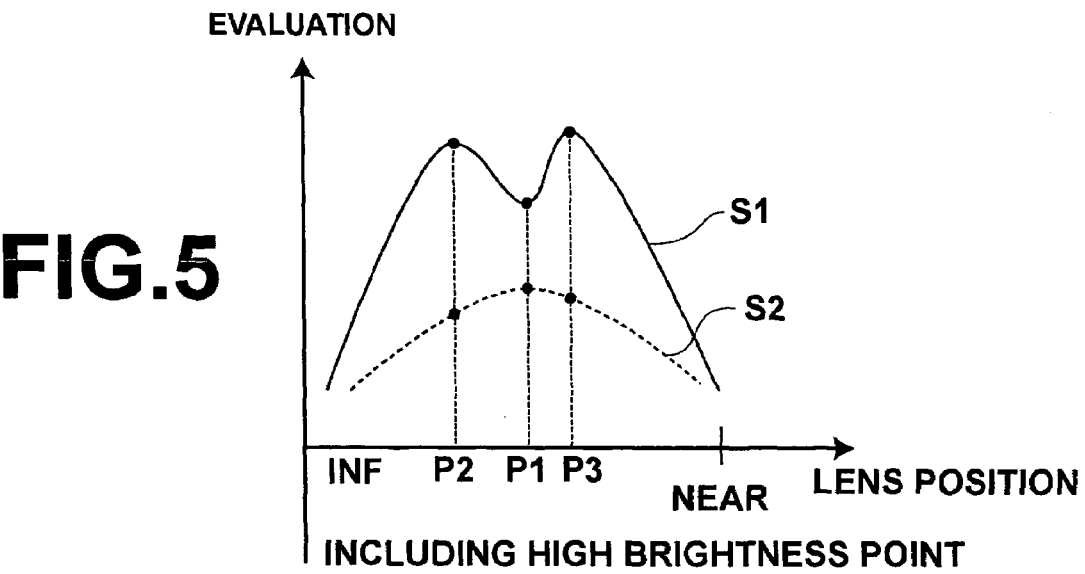
FIG.5 INCLUDING HIGH BRIGHTNESS POINT

LENS POSITION=P1

LENS POSITION=P2

LENS POSITION=P2

METHOD OF AND SYSTEM FOR AUTOFOCUS

This nonprovisional application claims priority under 35 U.S.C. § 119(a) on Patent Application No(s). 2002-283896 and 2003-085195 filed in JAPAN on Sep. 27, 2002 and Mar. 26, 2003, respectively, which is(are) herein incorporated by reference.

BACKGROUND OF THE INVENTION

1. Field of the Invention

This invention relates to an autofocus method and an autofocus system applied to, for instance, a digital camera.

2. Description of the Related Art

There has been known, as an autofocus system used in an imaging device such as a digital still camera or a digital video camera, an autofocus system which adjusts the focus by driving the image taking optical system of the imaging device according to an image signal obtained from a solid image taking element such as a CCD. As the method of adjusting the focus according to an image signal, there have been a contrast autofocus system and a peak autofocus system. In the contrast autofocus system, high-frequency components of the image signal are used, whereas in the peak autofocus system, high-frequency components of the brightness signal of the image signal are used.

In the contrast autofocus system, high-frequency components are extracted from the image signal, and the focusing lens is driven so that the evaluation on contrast obtained by integrating the extracted high-frequency components is maximized. This system is advantageous in that since the focusing point is determined on the basis of the sharpness of the subject, the focus can be accurately adjusted irrespective of the distance to the subject and at the same time, since high-frequency components are integrated within a range finder frame, autofocusing action is stabilized and an optimal focusing position can be readily detected.

However, the contrast autofocus system is disadvantageous in that since the imaging device is controlled so that the averaged contrast in the frame is maximized, it is generally difficult to correctly adjust the focus in the case where the subject is a night view including point light sources or of high brightness though in the case of an ordinary subject, the focus can be correctly adjusted.

Whereas, in the peak autofocus system, high-frequency components are extracted from the brightness signal of the image signal, the focusing position is detected by detecting the maximum value of the high-frequency components of the brightness signal of the image signal. The peak autofocus system is advantageous in that the focus can be adjusted more accurately than the contrast autofocus system when a high-brightness point exists in the frame.

Accordingly, there has been proposed, in Japanese Unexamined Patent Publication No. 2001-141989, an autofocus system in which in order to use the advantages of both the systems, one of the contrast autofocus system and the peak autofocus system is selectively used according, for instance, to the peak value of the brightness signal of the image signal representing the subject, or to the average of the brightness signal.

However, since the peak autofocus system is disadvantageous in that the output evaluation is small and the stability of the autofocusing action is bad, the autofocus system proposed in Japanese Unexamined Patent Publication No. 2001-141989 is disadvantageous in that the stability of the autofocusing action is bad when it operates in the peak autofocus system.

SUMMARY OF THE INVENTION

In view of the foregoing observations and description, the primary object of the present invention is to provide a method of and a system for autofocus which can stably and accurately adjust the focus even when the subject is of high brightness.

In accordance with a first aspect of the present invention, there is provided an autofocus method comprising the steps of taking an image of a subject by a solid image taking device including a first image taking element having a plurality of pixels and a second image taking element having a plurality of pixels smaller than those of the first image taking element, calculating a first evaluation on contrast obtained by integrating high-frequency components of a first image signal representing an image of the subject taken by the first image taking element, calculating a second evaluation on contrast obtained by integrating high-frequency components of a second image signal representing an image of the subject taken by the second image taking element, and adjusting the focus on the basis of the first and second evaluations on contrast so that the subject is imaged on the solid image taking device.

In accordance with a second aspect of the present invention, there is provided an autofocus system comprising a solid image taking device including a first image taking element having a plurality of pixels and a second image taking element having a plurality of pixels smaller than those of the first image taking element, a taking optical system for focusing light from a subject on the solid image taking device, a first evaluation calculating means which calculates a first evaluation on contrast obtained by integrating high-frequency components of a first image signal representing an image of the subject taken by the first image taking element, a second evaluation calculating means which calculates a second evaluation on contrast obtained by integrating high-frequency components of a second image signal representing an image of the subject taken by the second image taking element, and a focusing means which adjusts the focus of the taking optical system on the solid image taking device on the basis of the first and second evaluations on contrast.

The first and second image signals may represent either animations or stills.

The focusing means may adjust the focus on the basis of the second evaluation on contrast when the position of the taking optical system where the first evaluation on contrast is maximized differs from that where the second evaluation on contrast is maximized.

Further, the focusing means may adjust the focus on the basis of the second evaluation on contrast when the second evaluation on contrast has only one peak whereas the first evaluation on contrast has a plurality of peaks.

The autofocus system may further comprise a signal mixing means which generates a third image signal by mixing the first and second image signals, and a third evaluation calculating means which calculates a third evaluation on contrast obtained by integrating high-frequency components of the third image signal with the focusing means provided with a function of adjusting the focus of the taking optical system on the basis of the third evaluation on contrast.

Further, the autofocus system may further comprises a brightness measuring means which measures the brightness of the third image signal, and the focusing means may be arranged to adjust the focus of the taking optical system on the basis of the third evaluation on contrast when the brightness measured by the brightness measuring means is lower than a threshold value.

In accordance with the present invention, by adjusting the focus selectively on the basis of the first and second evaluations on contrast according to the brightness of the subject, the focus can be accurately adjusted even when the subject is of high brightness.

When the focusing means is arranged to adjust the focus on the basis of the second evaluation on contrast when the position of the taking optical system where the first evaluation on contrast is maximized differs from that where the second evaluation on contrast is maximized, the focus can be adjusted in the so-called contrast autofocus system even when the subject includes a high-brightness point and accordingly can be stably and accurately adjusted.

Further, when the focusing means is arranged to adjust the focus on the basis of the second evaluation on contrast when the second evaluation on contrast has only one peak whereas the first evaluation on contrast has a plurality of peaks, the focus can be adjusted in the so-called contrast autofocus system even when the subject includes a high-brightness point and accordingly can be stably and accurately adjusted.

When the autofocus system comprises a signal mixing means which generates a third image signal by mixing the first and second image signals and a third evaluation calculating means which calculates a third evaluation on contrast obtained by integrating high-frequency components of the third image signal so that the focusing means can adjust the focus of the taking optical system on the basis of the third evaluation on contrast, the focus can be stably and accurately adjusted even if the amount of light obtained from the subject is small since the third evaluation on contrast is obtained from the third image signal which has a signal value increased by mixing the first and second image signals. Further, when the focusing means is arranged to adjust the focus of the taking optical system on the basis of the third evaluation on contrast when the brightness measured by the brightness measuring means is lower than a threshold value, the focus can be more stably and accurately adjusted.

BRIEF DESCRIPTION OF THE DRAWINGS

FIG. 4 is a view showing the first and second evaluation curves on contrast S1 and S2 when the subject is free from a high brightness point, FIG. 5 is a view showing the first and second evaluation curves on contrast S1 and S2 when the subject includes a high brightness point.

DESCRIPTION OF THE PREFERRED EMBODIMENTS

Figure 1:
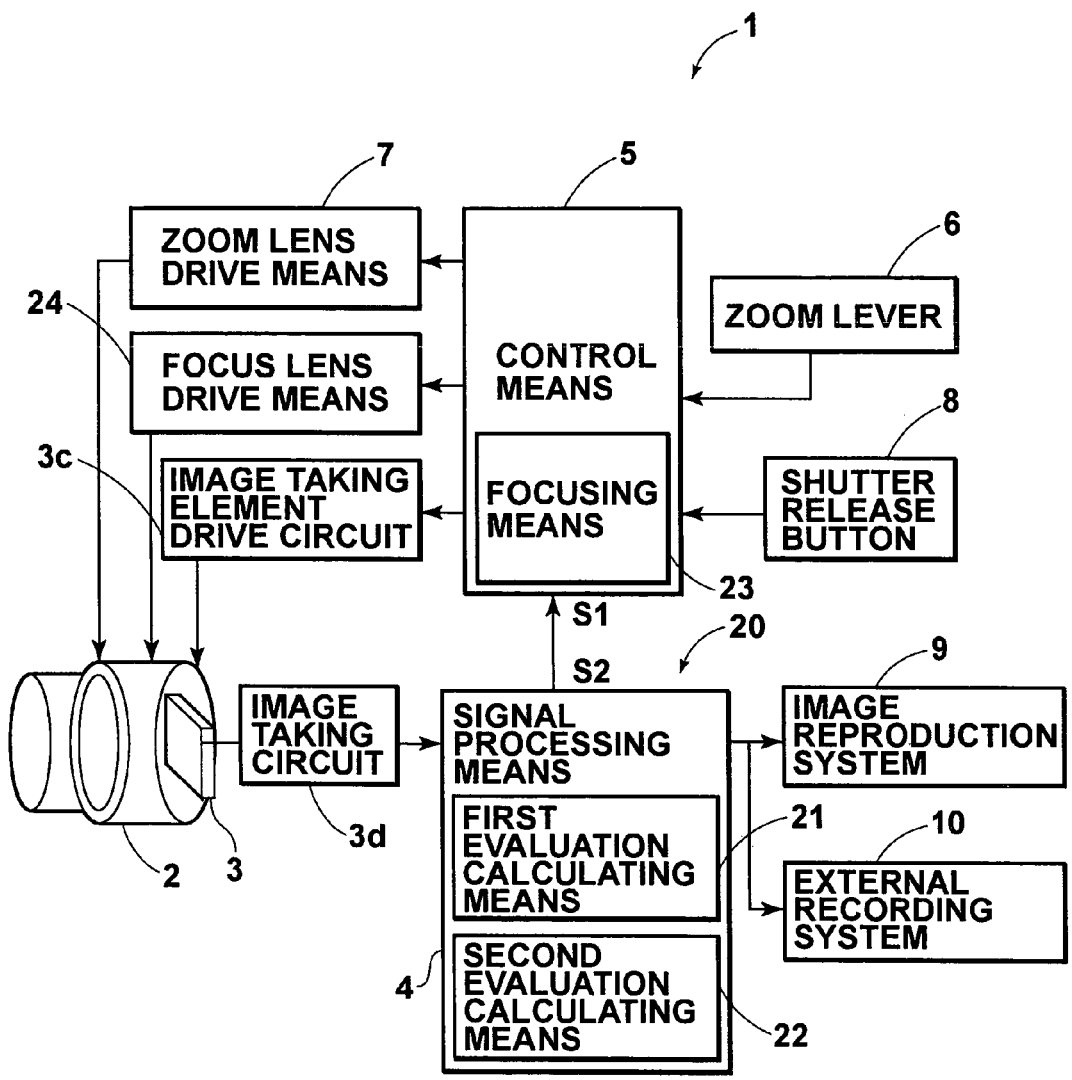
FIG. 1 is a schematic view showing a digital camera employing an autofocus system in accordance with an embodiment of the present invention.

FIG. 1 is a schematic view showing a digital camera employing an autofocus system in accordance with an embodiment of the present invention. The digital camera 1 comprises a taking optical system 2 which is for focusing light from a subject and includes a zoom lens and a focus lens, a solid image taking device 3 which receives light focused by the taking optical system 2 and outputs an image signal, a signal processing means 4 which processes the image signal output from the solid image taking device 3, a control means 5 which controls the digital camera 1, and an autofocus system 20 which automatically adjusts the focus by driving the focus lens.

The digital camera 1 is provided with a zoom lever 6, and a zoom lens drive means 7 drives the zoom lens in response to movement of the zoom lever 6. The digital camera 1 is further provided with an image reproduction system 9, e.g., a liquid crystal display, which reproduces a taken image and an external recording system 10 which stores image signals representing taken images in, for instance, a Smart Media®.

When taking a picture by the digital camera 1 of this embodiment, the zoom lever 6 is controlled viewing an image of a subject through a viewfinder or an image displayed on the screen of the image reproduction system 9. In response to control of the zoom lever 6, the zoom lens drive means 7 drives the zoom lens to set the magnification as designated by the zoom lever 6. Then when the shutter release button 8 is depressed halfway, the autofocus system 20 brings an object into focus and then when the shutter release button 8 is subsequently fully depressed, the shutter is released. Then an image signal obtained by the solid image taking device 3 is subjected to signal processing such as A/D conversion or image processing such as γ-correction by the signal processing means 4, and an image is displayed on the screen of the image reproduction system 9 on the basis of the processed image signal and the processed image signal is stored in a memory.

Figure 2:
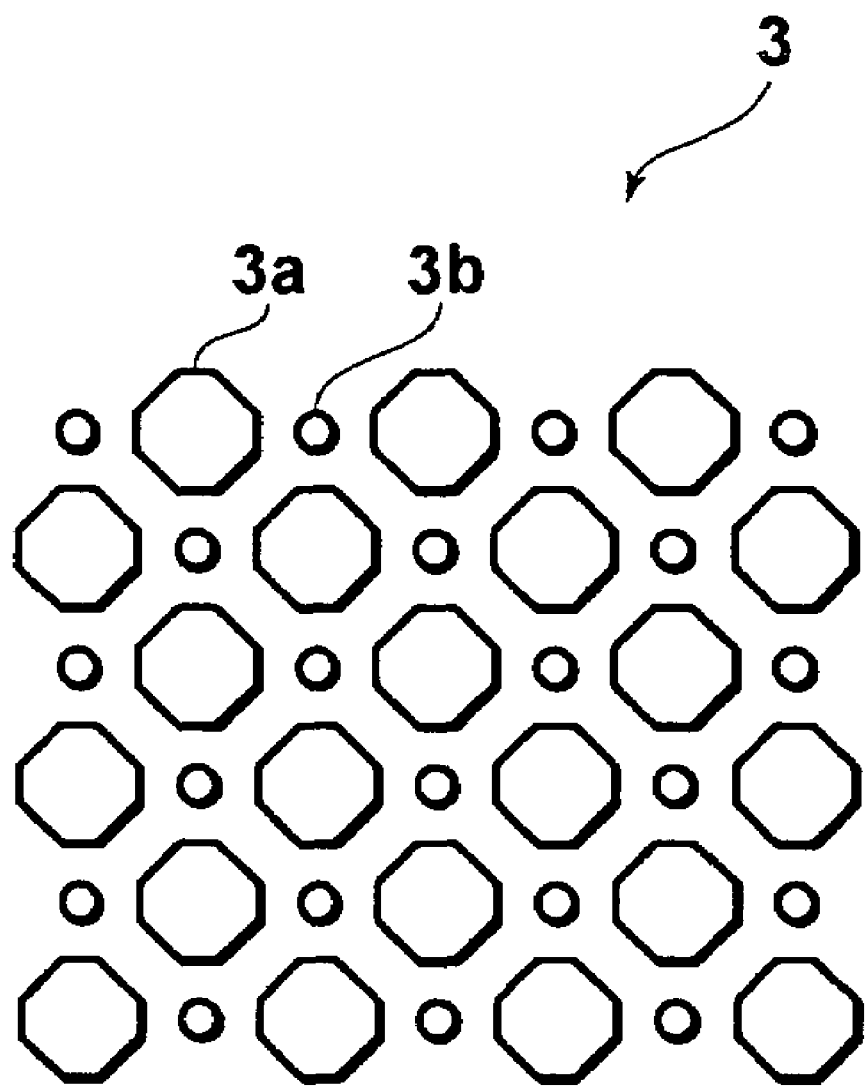
FIG. 2 is a view showing an example of the solid image taking device which can be employed in the digital camera shown in FIG. 1, FIGS. 3A and 3B are views showing examples of the evaluation curve on contrast.

As shown in FIG. 2, the solid image taking device 3 has so-called a double-honeycomb structure (see Japanese Unexamined Patent Publication No. 2002-16835) and comprises first and second image taking elements 3a and 3b. The first image taking element 3a comprises a plurality of pixels each of which is an octagon (honeycomb) in shape and is formed by a photodiode. The pixels of the first image taking elements 3a are arranged in rows each of which is shifted to an adjacent row by a ½ pitch. Each element of the first image taking elements 3a converts the amount of light it receives to a signal charge and transfers the signal charge to an image taking circuit 3d under the control of an image taking element drive circuit 3c. The image taking circuit 3d makes up a first image signal on the basis of the signal charges transferred from each pixel of the first image taking element 3a and sends the first image signal to the signal processing means 4.

Similarly, the second image taking element 3b comprises a plurality of pixels each of which is an octagon (honeycomb) in shape and is formed by a photodiode. The pixels of the second image taking elements 3b are positioned between pixels of the first image taking elements 3a and each of the pixels of the second image taking elements 3b is about 1/16 of the pixel of the first image taking element 3a. Each element of the second image taking elements 3b converts the amount of light it receives to a signal charge and transfers the signal charge to an image taking circuit 3d under the control of an image taking element drive circuit 3c. The image taking circuit 3d makes up a second image signal on the basis of the signal charges transferred from each pixel of the second image taking element 3a and sends the second image signal to the signal processing means 4.

The autofocus system 20 includes the taking optical system 2, the solid image taking device 3, a first evaluation calculating means 21, a second evaluation calculating means 22 and a focusing means 23. The first and second evaluation calculating means 21 and 22 are incorporated in the signal processing means 4 and calculates first and second evaluations on contrast S1 and S2 to be described later.

That is, the first evaluation calculating means 21 extracts high-frequency components from the digitized first image signal by the use of a high-pass filter or the like, and integrates the extracted high-frequency components by an integrating means, thereby obtaining a first evaluation on contrast S1. Similarly, the second evaluation calculating means 21 extracts high-frequency components from the digitized second image signal by the use of a high-pass filter or the like, and integrates the extracted high-frequency components by an integrating means, thereby obtaining a second evaluation on contrast S2.

The focusing means 23 adjusts the focus in so-called a contrast autofocus system, and controls a focus lens drive means 24 to move the focus lens to a focusing position where the evaluation on contrast is maximized between the extremely near range and infinity.

Figure 3A:
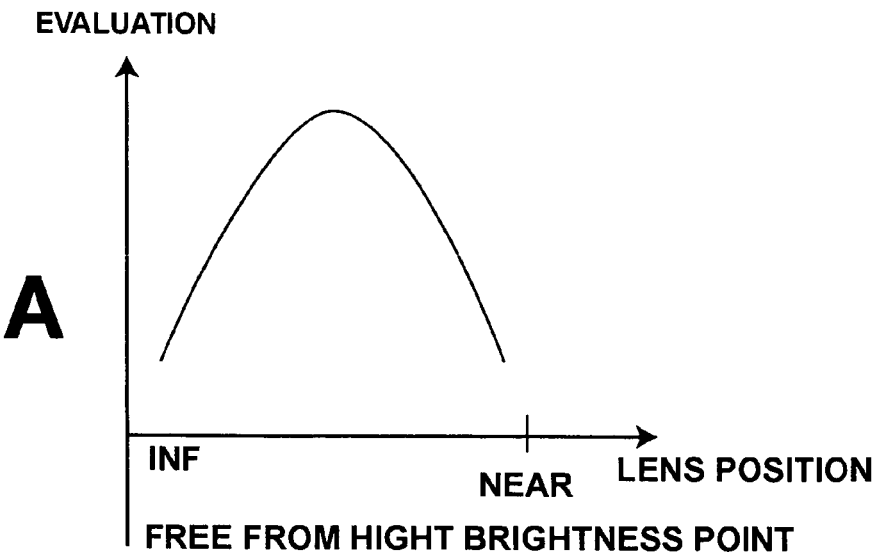

In the contrast autofocus system using an ordinary solid image taking device, in the case of ordinary subjects free from a high brightness point, the evaluation curve of contrast has a single peak as shown in FIG. 3A, and by focusing with the lens position corresponding to the peak taken as the focusing point results in a very accurate focusing.

Figure 3B:
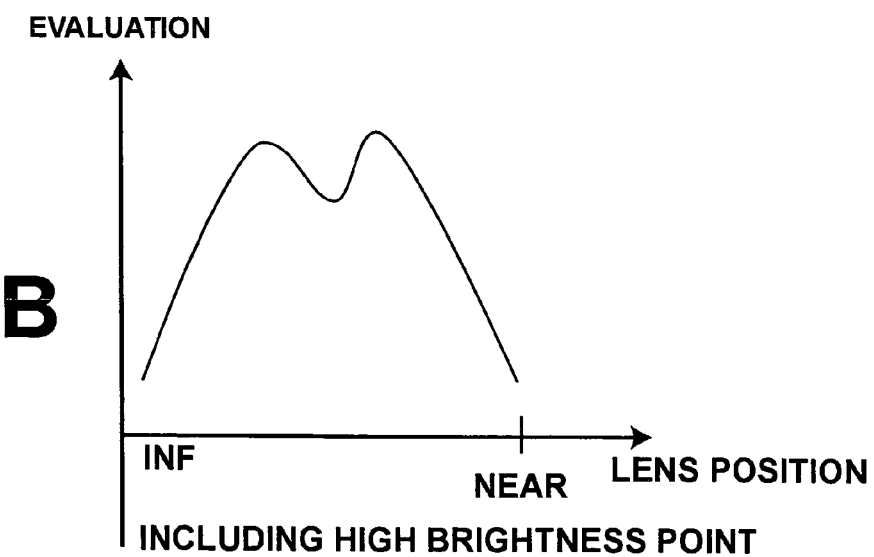

Whereas, when the subject includes a high brightness point, the evaluation curve of contrast has a plurality of peaks as shown in FIG. 3B due to a false peak generated in the evaluation curve of contrast. This makes it in feasible to accurately focus in the contrast autofocus system. Since the false peak is generated due to saturation of the output of the pixel or pixels corresponding to the high brightness point, generation of the false peak can be avoided by reducing the output of the image taking device. However, when the output of the image taking device is reduced, for instance, by shortening the exposure time, the evaluation on contrast becomes too small to accurately measure the distance to the subject in the case of an ordinary image taking device.

The focusing means 23 adjusts the focus on the basis of the first and second evaluations on contrast S1 and S2 to be described hereinbelow.

In the case where the subject is free from a high brightness point, both the first and second evaluation curves on contrast S1 and S2 have a single peak at substantially the same lens position as shown in FIG. 4. In this case, the focusing means 23 adjusts the focus using the first evaluation on contrast S1 which is larger in evaluation and more stable than the second evaluation on contrast S2.

Whereas, when the subject includes a high brightness point, the first evaluation curve on contrast S1 has two peaks and the second evaluation curve on contrast S2 has a single peak as shown in FIG. 5. In this case, the focusing means 23 adjusts the focus using the second evaluation on contrast S2. That is, since being smaller in size than those of the first image taking element 3b, the pixels of the second image taking element 3a are deeper in depth of field than those of the first image taking element 3b and accordingly, the second evaluation curve on contrast S2 obtained from the second image taking element 3b has a peak at which the evaluation is maximized even if the subject includes a high brightness point. By adjusting the focus using the second evaluation on contrast S2 when the subject includes a high brightness point, the focus can be stably and accurately adjusted.

Figure 6A:
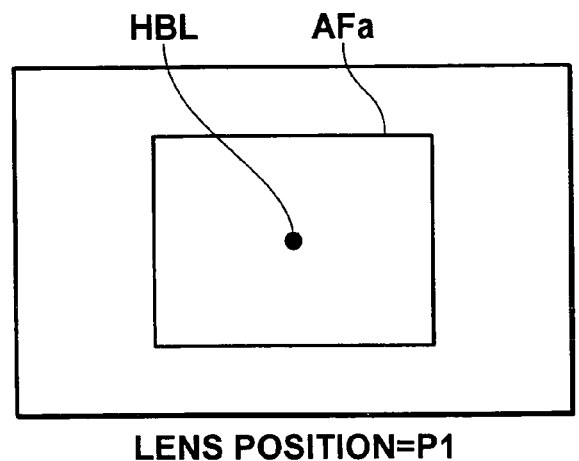
FIGS. 6A to 6C are views showing images of the subject including a high brightness region taken by the first and second image taking elements 3a and 3b with the lens position set to P1, P2 and P3, respectively.
Figure 6B:
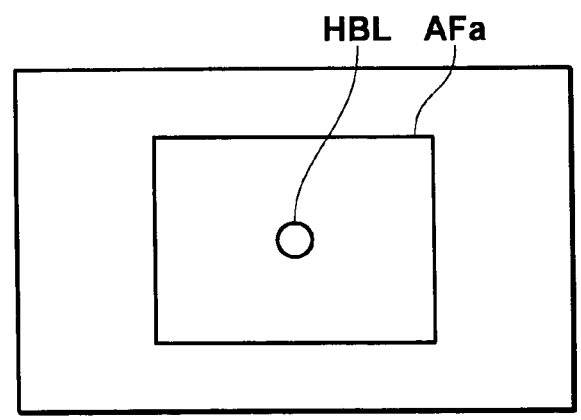
Figure 6C:
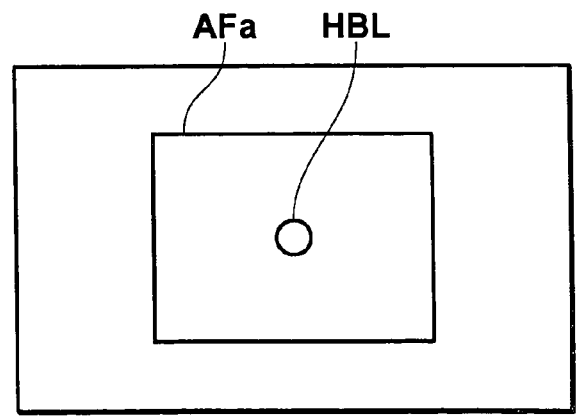
Figure 7:
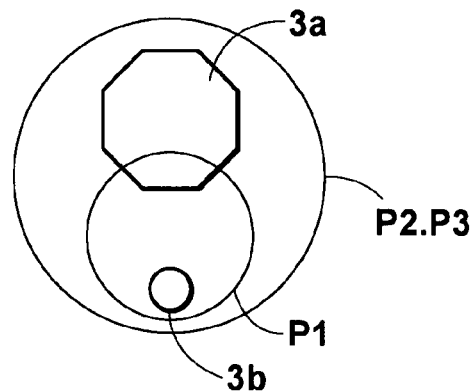
FIG. 7 is a view showing images of the high brightness region taken by the first and second image taking elements 3a and 3b with the lens position set to P1, P2 and P3.

First and second evaluations on contrast S1 and S2 when the image includes a high brightness region like a point source will be described with reference to FIGS. 6A to 6C and FIG. 7, hereinbelow. FIGS. 6A to 6C show images of the subject including a high brightness region taken by the first and second image taking elements 3a and 3b with the lens position set to P1, P2 and P3, respectively. FIG. 7 shows images of the high brightness region taken by the first and second image taking elements 3a and 3b with the lens position set to P1, P2 and P3.

Description will be made first on the first evaluation on contrast S1 obtained from the first image taking element 3a which is large in light receiving area. Since the high brightness region is in focus when the lens is in the lens position P1 and out of focus when the lens is in the lens position P2 or P3. Accordingly, the size of the image of the high brightness region HBL is minimized when the lens is in the lens position P1 and is larger when the lens is in the lens position P2 or P3.

As shown in FIG. 7, since being large in the light receiving area, the first image taking element 3a detects the change in size of the image of the high brightness region HBL and the output of the first image taking element 3a is larger when the lens position is P2 or P3 than when the lens position is P1. This is because, in the case where the amount of light from the high brightness region is of such a level that reaches the saturation signal level of the first image taking element 3a, the output signals of the pixels of the first image taking element 3a are on the saturation signal level (white drop-out) even if the lens position is P2 or P3. See also FIGS. 6A to 6C.

That is, as the high brightness region is out of focus and the size of the image thereof is enlarged, the first evaluation on contrast S1 obtained by integrating the high-frequency components over the autofocus area AFa is larger when the lens position is P2 or P3 than when the lens position is P1. That is, in this case, the first evaluation on contrast S1 changes to form a valley as shown in FIG. 5. Accordingly, depending on the condition of the subject, the lens cannot be moved to a correct focusing position and the obtained image can be out of focus when the focus is adjusted on the basis of the first evaluation on contrast S1.

Whereas, in the case of taking an image of the subject including a high brightness region by the second image taking element which is small in light receiving area, the amount of light received by each pixel of the second image taking element is larger when the lens position P1 and the size of the image of the high brightness region HBL is minimized than when the lens position is P2 or P3 and the size of the image of the high brightness region HBL is larger as can be understood from FIG. 7. That is, when the object including the high brightness region is out of focus, the pixels of the second image taking element 3b cannot be saturated, and accordingly, the second evaluation on contrast S2 changes to form a single peak when the lens position is P1 as shown in FIG. 5. In such a case, the lens can be more accurately focused by focusing on the basis of the second evaluation on contrast S2.

Though, the pixels of the second image taking element 3b is 1/16 of the pixels of the first image taking element 3a in size but the saturation signal level of the second image taking element 3b is 1/4 of that of the first image taking element. Accordingly, the pixels of the second image taking element 3b have dynamic ranges four times as wide as those of the pixels of the first image taking element 3a. That is, even if the pixels of the first image taking element 3a are saturated by the high brightness region, the pixels of the second image taking element 3b are not saturated and accordingly, the second evaluation curve on contrast S2 has a single peak.

Especially, since false peaks generally appear on opposite sides of a real peak, a single peak of the second evaluation on contrast S2 is reliable as corresponding to a focusing lens position when the single peak of the second evaluation on contrast S2 is between peaks of the first evaluation on contrast S1.

Figure 8:
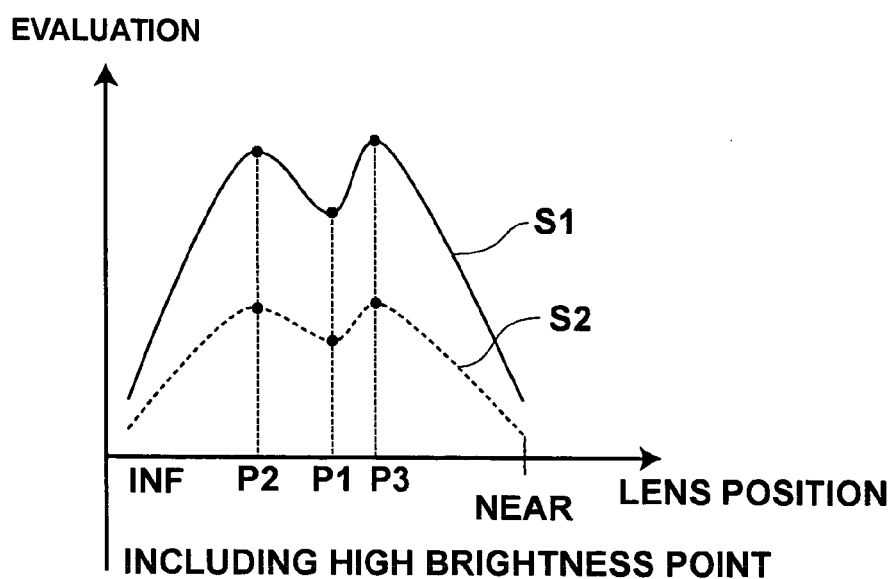
FIG. 8 is a view showing the first and second evaluation curves on contrast S1 and S2 when the subject includes a very high brightness point.

Further, when the subject (frame) includes a very high brightness region, false peaks can be generated in the second evaluation curve on contrast S2 as well as in the first evaluation curve on contrast S1 as shown in FIG. 8. This is because the output voltage from each pixel is saturated in not only the first image taking element 3a but also the second image taking element 3b even in the state shown in FIG. 6B or 6C. In this case, by adjusting the focus with the taking conditions such as the exposure time of the solid image taking element changed, the focusing accuracy can be enhanced.

Figure 9:
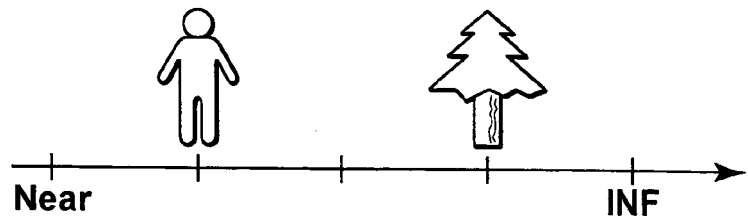
FIG. 9 is a view showing the first and second evaluation curves on contrast S1 and S2 when the subject includes near and far objects.

Even when the subject does not include a high brightness region, the first and second evaluation curves on contrast S1 and S2 can have a plurality of peaks if the subject includes near and far objects as shown in FIG. 9. There sometimes occurs a phenomenon that the background is brought into focus when the focus is adjusted on the basis of the first or second evaluation of focus S1 or S2. In such a case, the control means 5 may be arranged to control the taken optical system 2 to reduce the depth of field so that the near object is brought into focus. See Japanese Unexamined Patent Publication No. 5(1993)-80386.

Figure 10:
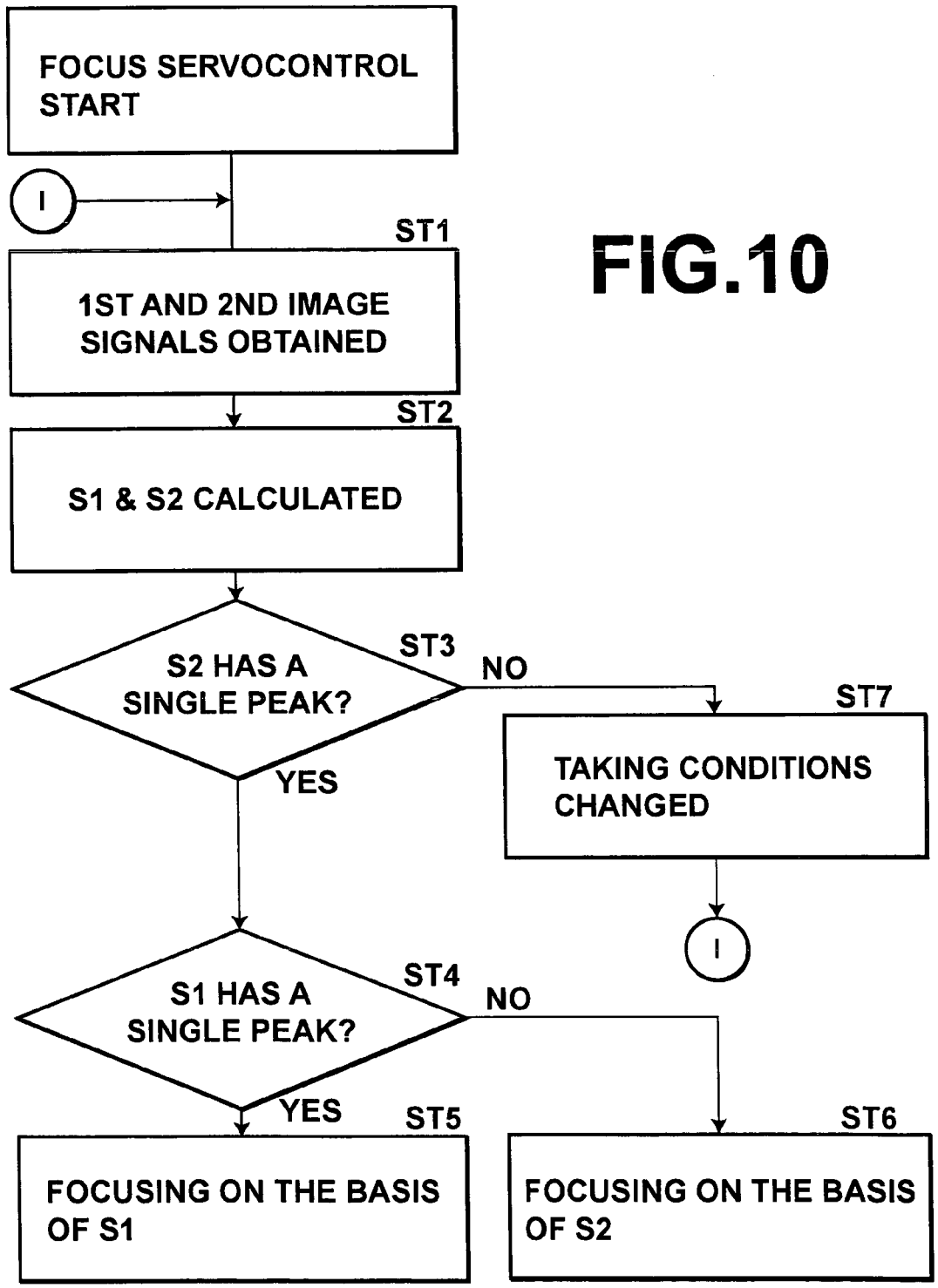
FIG. 10 is a flow chart for illustrating an autofocus method in accordance with a preferred embodiment of the present invention.

FIG. 10 is a flow chart for illustrating an autofocus method in accordance with a preferred embodiment of the present invention. With reference to FIGS. 1 to 10, the autofocus method of the present invention will be described in more detail, hereinbelow. When light from a subject impinges upon the solid image taking device 3 through the taking optical system 2, first and second image signals are input into the signal processing means 4 from the solid image taking device 3 by way of the image taking circuit 3d. (step ST1)

The first evaluation calculating means 21 calculates a first evaluation on contrast S1 from the first image signal from the first image taking element 3a and the second evaluation calculating means 22 calculates a second evaluation on contrast S2 from the second image signal from the second image taking element 3b. (step ST2) The first and second evaluations on contrast S1 and S2 are sent to the focusing means 23, and the focusing means 23 determines which evaluation on contrast is to be used according to the profiles of the first and second evaluations on contrast S1 and S2. (steps ST3 and ST4)

That is, when the first and second evaluation curves on contrast S1 and S2 both have a single peak in substantially the same lens position (FIG. 4), the focus is adjusted on the basis of the first evaluation on contrast S1 and the focus lens drive means 24 drives the focus lens to a position where the first evaluation on contrast S1 is maximized. (step ST5)

Whereas, when the second evaluation curve on contrast S2 has a single peak though the first evaluation curve on contrast S1 has a plurality of peaks including false peaks (FIG. 5), that is, when the subject includes a high brightness object, the focus is adjusted on the basis of the second evaluation on contrast S2 and the focus lens drive means 24 drives the focus lens to a position where the second evaluation on contrast S2 is maximized. (step ST6)

When the subject (frame) includes such a very high brightness object that generates false peaks in the second evaluation curve on contrast S2 as well as in the first evaluation curve on contrast S1 as shown in FIG. 8, the taking conditions such as the exposure time of the solid image taking element are changed (step ST7) and the focus is adjusted (steps ST1 to ST6)

Thus, in accordance with the present invention, since both the first evaluation on contrast S1 which is larger in evaluation and the second evaluation on contrast S2 which is smaller in evaluation can be obtained at one time, the autofocus servocontrol need not be repeated a plurality of times even if the subject includes a high brightness object and the focus can be adjusted accurately and stably in a short time.

Figure 11:
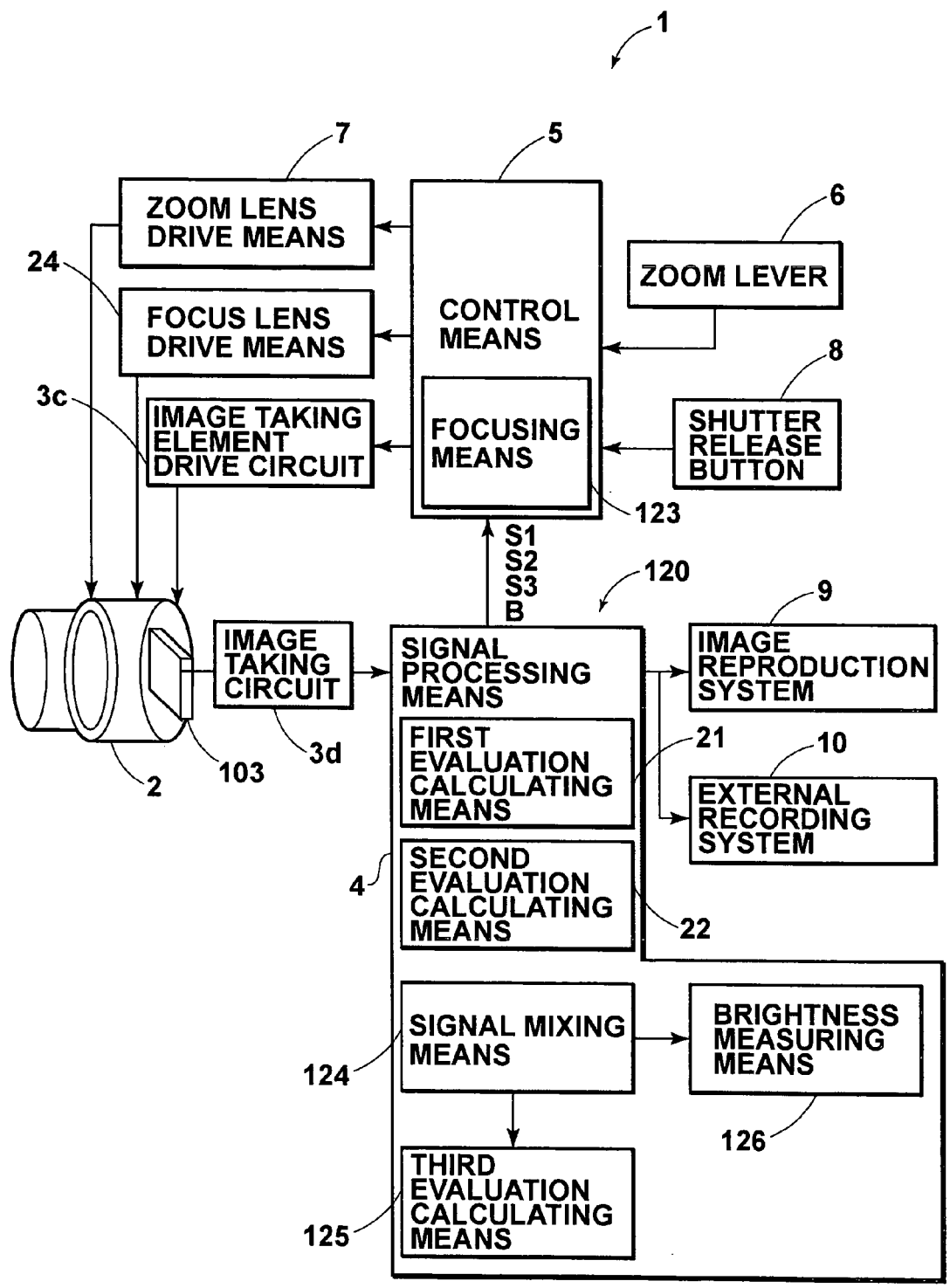
FIG. 11 is a schematic view showing a digital camera employing an autofocus system in accordance with another embodiment of the present invention.

An autofocus system in accordance with another embodiment of the present invention will be described with reference to FIG. 11, hereinbelow. The elements analogous to those shown in FIG. 1 will be given the same reference numerals in FIG. 11 and will not be described here. The autofocus system 120 differs from that 20 shown in FIG. 1 in that a third evaluation on contrast S3 is calculated.

That is, the autofocus system 120 includes signal mixing means 124 which generates a third image signal by mixing the first and second image signals, and a third evaluation calculating means 125 which calculates a third evaluation on contrast S3 obtained by integrating high-frequency components of the third image signal, and a brightness measuring means 126 which measures the brightness (the brightness components) B of the third image signal. The calculated first to third evaluations S1 to S3 and the measured brightness B are sent to the focusing means 123.

The focusing means 123 determines according to the measured brightness B whether the focus is to be adjusted on the basis of the first and second evaluations on contrast S1 and S2 or of the third evaluation on contrast S3. That is, the focusing means 123 has been provided with a preset threshold value and when the measured brightness B is lower than the threshold value, the focusing means 123 detects the focusing position on the basis of the third evaluation on contrast S3. Whereas, when the measured brightness B is not lower than the threshold value, the focusing means 123 detects the focusing position on the basis of the first and second evaluations on contrast S1 and S2.

That is, in the case of an image of a very low brightness, the output values of the first and second image signals from the first and second image taking elements 3a and 3b are also small. This results in small first and second evaluations on contrast S1 and S2, and deterioration in reliability of focusing. When the first and second image signals are mixed to form a third image signal, the signal value is increased and accordingly, the third evaluation on contrast S3 obtained from the third image signal can be large, whereby the focus can be accurately and stably adjusted.

Figure 12:
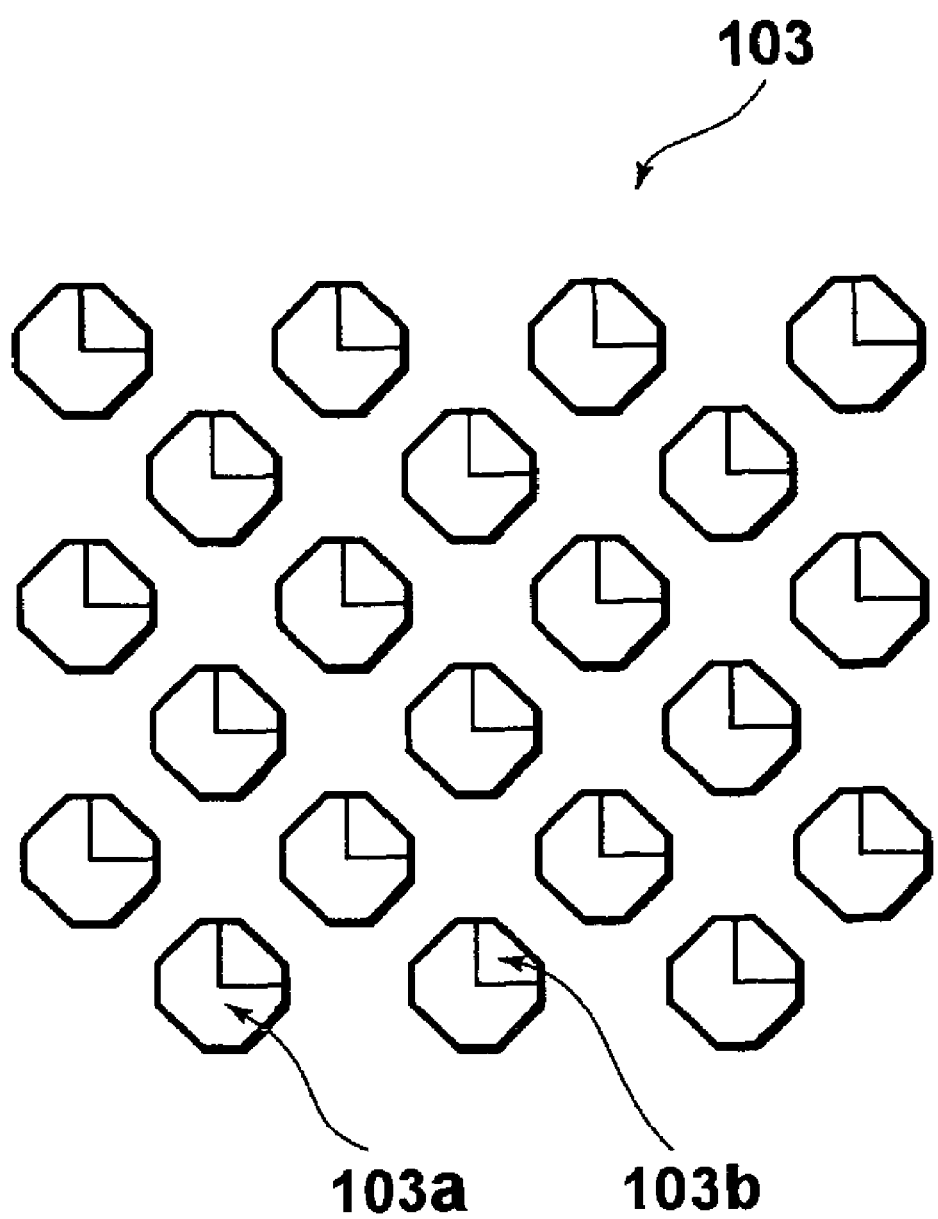
FIG. 12 is a view showing an example of the solid image taking device which can be employed in the digital camera shown in FIG. 11.

In this embodiment, it is preferred that a solid taking device 103 shown in FIG. 12 be employed. In the solid taking device 103 shown in FIG. 12, each of the pixels is like a honeycomb in shape and the pixels are arranged in rows each of which is shifted to an adjacent row by a ½ pitch. Further, each pixel is formed by a pixel of a first image taking element 103a and a pixel of a second image taking element 103b which is smaller than the pixel of the first image taking element 103a. The first image taking element 103a outputs a first image signal, and the second image taking element 103b outputs a second image signal.

Though, in this embodiment, the autofocus system 120 generates the third image signal by mixing the first and second image signals after digitization, the autofocus system 120 may generate the third image signal by mixing the first and second image signals in an analog state or by mixedly reading out the image signal components from pixels of the first and second image taking elements 103a and 103b as is well known in the art.

In accordance with the embodiments described above, by adjusting the focus selectively on the basis of the first and second evaluations on contrast S1 and S2, the focus can be accurately and stably adjusted even when the subject is of high brightness.

When the focusing means 23 is arranged to adjust the focus on the basis of the second evaluation on contrast S2 when the position of the taking optical system where the first evaluation on contrast S1 is maximized differs from that where the second evaluation on contrast S2 is maximized, the focus can be adjusted in the so-called contrast autofocus system even when the subject includes a high-brightness point and accordingly can be stably and accurately adjusted.

Further, when the focusing means 23 is arranged to adjust the focus on the basis of the second evaluation on contrast S2 when the second evaluation on contrast S2 has only one peak whereas the first evaluation on contrast S1 has a plurality of peaks, the focus can be adjusted in the so-called contrast autofocus system even when the subject includes a high-brightness point and accordingly can be stably and accurately adjusted.

When the focusing means 123 has a function of adjusting the focus on the basis of the third evaluation on contrast S3, the focus can be stably and accurately adjusted even if the amount of light obtained from the subject is small since the third evaluation on contrast is obtained from the third image signal which has a signal value increased by mixing the first and second image signals.

Further, when the focusing means 123 is arranged to adjust the focus of the taking optical system on the basis of the third evaluation on contrast S3 when the brightness B measured by the brightness measuring means 126 is lower than a threshold value, the focus can be more stably and accurately adjusted since whether the focus is to be adjusted on the basis of the first and second evaluations on contrast S1 and S2 or of the third evaluation on contrast S3 is switched according to the measured brightness B.

The present invention need not be limited to the illustrated embodiments described above. For example, though in the embodiments described above, when the subject is free from a high brightness object, that is, when no high brightness object exists in the field to be taken, the focus is adjusted on the basis of the first evaluation on contrast S1, the focus may be adjusted on the basis of the second evaluation on contrast S2 in such a case. That is, only the second evaluation on contrast S2 may be employed to adjust the focus.

What is claimed is:

1. An autofocus method comprising the steps of
   taking an image of a subject by a solid image taking device including a first image taking element having a plurality of pixels and a second image taking element having a plurality of pixels smaller than those of the first image taking element,
   calculating a first evaluation on contrast obtained by integrating high-frequency components of a first image signal representing an image of the subject taken by the first image taking element,
   calculating a second evaluation on contrast obtained by integrating high-frequency components of a second image signal representing an image of the subject taken by the second image taking element, and
   adjusting the focus on the basis of the first and second evaluations on contrast so that the subject is imaged on the solid image taking device.

2. An autofocus method as defined in claim 1, further comprising the steps of:
   generating a third image signal by mixing the first and second image signals; and
   calculating a third evaluation on contrast obtained by integrating high-frequency components of the third image signal,
   wherein the step of adjusting the focus comprises adjusting the focus on the basis of the third evaluation on contrast so that the subject is imaged on the solid image taking device.

3. An autofocus method as defined in claim 2, further comprising the step of:
   measuring the brightness of the third image signal,
   wherein the step of adjusting the focus comprises adjusting the focus on the basis of the third evaluation on contrast when the brightness of the third image signal is lower than a threshold value.

4. An autofocus method as defined in claim 1,
   wherein the step of adjusting the focus comprises adjusting the focus on the basis of the second evaluation on contrast when the position of a taking optical system where the first evaluation on contrast is maximized differs from that where the second evaluation on contrast is maximized.

5. An autofocus method as defined in claim 4, further comprising the steps of
   generating a third image signal by mixing the first and second image signals; and
   calculating a third evaluation on contrast obtained by integrating high-frequency components of the third image signal,
   wherein the step of adjusting the focus comprises adjusting the focus on the basis of the third evaluation on contrast so that the subject is imaged on the solid image taking device.

6. An autofocus method as defined in claim 5, further comprising the step of:

measuring the brightness of the third image signal,
wherein the step of adjusting the focus comprises adjusting the focus on the basis of the third evaluation on contrast when the brightness of the third image signal is lower than a threshold value.

7. An autofocus method as defined in claim 1,
wherein the step of adjusting the focus comprises adjusting the focus on the basis of the second evaluation on contrast when the second evaluation on contrast has only one peak whereas the first evaluation on contrast has a plurality of peaks.

8. An autofocus method as defined in claim 7, further comprising the steps of:
generating a third image signal by mixing the first and second image signals; and
calculating a third evaluation on contrast obtained by integrating high-frequency components of the third image signal,
wherein the step of adjusting the focus comprises adjusting the focus on the basis of the third evaluation on contrast so that the subject is imaged on the solid image taking device.

9. An autofocus method as defined in claim 8, further comprising the step of:
measuring the brightness of the third image signal,
wherein the step of adjusting the focus comprises adjusting the focus on the basis of the third evaluation on contrast when the brightness of the third image signal is lower than a threshold value.

10. An autofocus system comprising
a solid image taking device including a first image taking element having a plurality of pixels and a second image taking element having a plurality of pixels smaller than those of the first image taking element,
a taking optical system for focusing light from a subject on the solid image taking device,
a first evaluation calculating means which calculates a first evaluation on contrast obtained by integrating high-frequency components of a first image signal representing an image of the subject taken by the first image taking element,
a second evaluation calculating means which calculates a second evaluation on contrast obtained by integrating high-frequency components of a second image signal representing an image of the subject taken by the second image taking element, and
a focusing means which adjusts the focus of the taking optical system on the solid image taking device on the basis of the first and second evaluations on contrast.

11. An autofocus system as defined in claim 10 further comprising a signal mixing means which generates a third image signal by mixing the first and second image signals, and a third evaluation calculating means which calculates a third evaluation on contrast obtained by integrating high-frequency components of the third image signal in which the focusing means is provided with a function of adjusting the focus of the taking optical system on the basis of the third evaluation on contrast.

12. An autofocus system as defined in claim 10 further comprising a brightness measuring means which measures the brightness of the third image signal in which the focusing means is arranged to adjust the focus of the taking optical system on the basis of the third evaluation on contrast when the brightness measured by the brightness measuring means is lower than a threshold value.

13. An autofocus system as defined in claim 10 in which the focusing means adjusts the focus on the basis of the second evaluation on contrast when the position of the taking optical system where the first evaluation on contrast is maximized differs from that where the second evaluation on contrast is maximized.

14. An autofocus system as defined in claim 13 further comprising a signal mixing means which generates a third image signal by mixing the first and second image signals, and a third evaluation calculating means which calculates a third evaluation on contrast obtained by integrating high-frequency components of the third image signal in which the focusing means is provided with a function of adjusting the focus of the taking optical system on the basis of the third evaluation on contrast.

15. An autofocus system as defined in claim 14 further comprising a brightness measuring means which measures the brightness of the third image signal in which the focusing means is arranged to adjust the focus of the taking optical system on the basis of the third evaluation on contrast when the brightness measured by the brightness measuring means is lower than a threshold value.

16. An autofocus system as defined in claim 10 in which the focusing means adjusts the focus on the basis of the second evaluation on contrast when the second evaluation on contrast has only one peak whereas the first evaluation on contrast has a plurality of peaks.

17. An autofocus system as defined in claim 16 further comprising a signal mixing means which generates a third image signal by mixing the first and second image signals, and a third evaluation calculating means which calculates a third evaluation on contrast obtained by integrating high-frequency components of the third image signal in which the focusing means is provided with a function of adjusting the focus of the taking optical system on the basis of the third evaluation on contrast.

18. An autofocus system as defined in claim 17 further comprising a brightness measuring means which measures the brightness of the third image signal in which the focusing means is arranged to adjust the focus of the taking optical system on the basis of the third evaluation on contrast when the brightness measured by the brightness measuring means is lower than a threshold value.

* * * * *